United States Patent
Murofushi et al.

(10) Patent No.: US 7,544,536 B2
(45) Date of Patent: Jun. 9, 2009

(54) METAL OXIDE DISPERSION FOR DYE-SENSITIZED SOLAR CELLS, PHOTOACTIVE ELECTRODE AND DYE-SENSITIZED SOLAR CELL

(75) Inventors: Katsumi Murofushi, Kanagawa (JP); Kunio Kondo, Kanagawa (JP); Ryusuke Sato, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 79 days.

(21) Appl. No.: 11/604,761

(22) Filed: Nov. 28, 2006

(65) Prior Publication Data

US 2007/0069338 A1   Mar. 29, 2007

Related U.S. Application Data

(62) Division of application No. 10/468,679, filed as application No. PCT/JP02/01473 on Feb. 20, 2002, now Pat. No. 7,157,788.

(30) Foreign Application Priority Data

Feb. 21, 2001   (JP) ............................. 2001-44470

(51) Int. Cl.
  *H01L 21/00* (2006.01)
  *H01L 21/16* (2006.01)
(52) U.S. Cl. ................ 438/104; 438/85; 438/780; 257/E21.17; 257/E21.078; 257/E21.273; 257/E21.274; 257/E21.278; 257/E31.126
(58) Field of Classification Search ............. 438/85, 438/99, 104, 513, 680, 681, 723, 743, 756, 438/780, 781
See application file for complete search history.

(56) References Cited

U.S. PATENT DOCUMENTS

| | | | |
|---|---|---|---|
| 4,705,739 A | 11/1987 | Fisch | |
| 5,182,343 A | 1/1993 | Ono et al. | |
| 5,350,820 A | 9/1994 | Ono et al. | |
| 5,700,608 A | 12/1997 | Eshelman et al. | |
| 5,882,723 A | 3/1999 | Tsou | |
| 5,885,368 A | 3/1999 | Lupo et al. | |
| 5,939,182 A * | 8/1999 | Huang et al. | 428/323 |
| 6,268,588 B1 | 7/2001 | Hazebrouck et al. | |
| 6,350,946 B1 | 2/2002 | Miyake et al. | |
| 6,517,961 B1 * | 2/2003 | Agata et al. | 428/702 |
| 7,157,788 B2 * | 1/2007 | Murofushi et al. | 257/643 |

FOREIGN PATENT DOCUMENTS

| | | |
|---|---|---|
| JP | 51-008192 | 1/1976 |
| JP | 53-147698 | 12/1978 |
| JP | 57-123824 A | 8/1982 |
| JP | 10-93118 A | 4/1998 |
| JP | 10-112337 A | 4/1998 |
| JP | 11-283682 A | 10/1999 |
| JP | 11-288745 A | 10/1999 |
| JP | 11-339867 A | 12/1999 |
| JP | 2000-077691 A | 3/2000 |
| JP | 2000-100482 A | 4/2000 |
| JP | 2000-113913 A | 4/2000 |
| JP | 2000-228234 A | 8/2000 |
| JP | 2000-235874 A | 8/2000 |
| JP | 2000-251957 A | 9/2000 |
| JP | 2001-43907 A | 2/2001 |
| JP | 2001-357899 A | 12/2001 |

* cited by examiner

*Primary Examiner*—David Nhu
(74) *Attorney, Agent, or Firm*—Sughrue Mion PLLC (57) ABSTRACT

(1) A metal oxide dispersion for a dye-sensitized solar cell, which contains metal oxide fine particles, a binder composed of a polymer compound having an action to bind to the fine particles and a solvent; (2) a method for producing a photoactive electrode for a dye-sensitized solar cell by coating a dispersion containing the above-mentioned binder and metal oxide fine particles on a sheet-shaped electrode; (3) a photoactive electrode for a dye-sensitized solar cell, obtained by the method, which electrode has metal oxide containing the above-mentioned binder and metal oxide fine particles; and (4) a dye-sensitized solar cell with the above-mentioned photoactive electrode. According to the present invention, a porous metal oxide film can be formed without performing sintering at high temperatures, so that a flexible, inexpensive dye-sensitized solar cell can be obtained in which a resin material which has high transparency, is inexpensive and light in weight and has freedom in shape can be used as a sheet-shaped electrode substrate.

3 Claims, 1 Drawing Sheet

PRIOR ART

METAL OXIDE DISPERSION FOR DYE-SENSITIZED SOLAR CELLS, PHOTOACTIVE ELECTRODE AND DYE-SENSITIZED SOLAR CELL

CROSS-REFERENCE TO RELATED APPLICATIONS

This application is a Divisional of U.S. application Ser. No. 10/468,679 filed Aug. 21,2003, now U.S. Pat. No. 7,157,788, which was a 371 of PCT/JP02/01473 filed Feb. 20,2002; the above-noted application incorporated herein by reference in its entirety.

TECHNICAL FIELD

The present invention relates to a metal oxide dispersion for dye-sensitized solar cells, which are photoelectric conversion elements, a photoactive electrode for dye-sensitized solar cells with the metal oxide dispersion and to a production method therefor as well as to a dye-sensitized solar cell with the photoactive electrode.

BACKGROUND ART

The prototype of a dye-sensitized solar cell was a photoelectric conversion element or solar cell that Graezel, et al. of Ecole Polytechnique Federale de Lausanne first reported in 1991 (M. Graezel, Nature, 353, 737 (1991)), and generally called a dye-sensitized solar cell, a wet-type solar cell, or a Graezel-type solar cell. The feature of the photoelectric conversion element is that it has high photoelectric conversion efficiency as high as that of amorphous silicon-type solar cells and that its production cost can be lowered.

Figure 1:
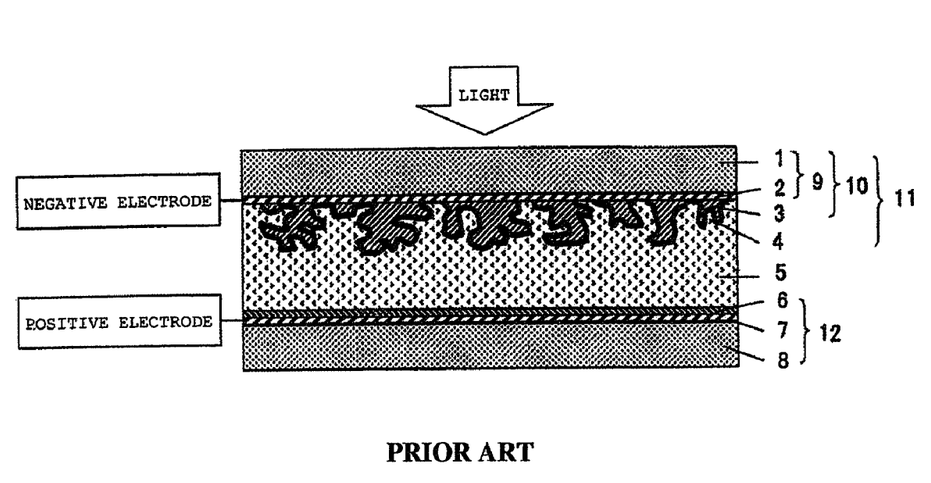
FIG. 1 is a cross-sectional view schematically showing the construction of a standard dye-sensitized solar cell.

FIG. 1 is a schematic cross-sectional view showing a typical dye-sensitized solar cell. The dye-sensitized solar cell comprises three parts, i.e., a dye electrode 11, an electrolytic layer 5, and a counter electrode 12. Here, the dye electrode 11 has a structure having a sheet-shaped electrode 9 composed of a substrate 1 and an electroconducting layer 2 having formed thereon a porous metal oxide film 3 (collectively called "photoactive electrode 10") carrying a sensitizing dye 4 thereon. On the other hand, the counter electrode 12 has a structure having a sheet-shaped electrode 12 composed of a substrate 8 having an electroconducting film 7, the electrode 12 having formed thereon a catalyst layer 6. Here, the catalyst plays a role of promoting reduction reaction of electrolyte in the electrolytic solution when the cell is in service. Generally, platinum, carbon black or graphite is used as the catalyst. The electrolytic layer 5, which is generally composed of a solution of an electrolyte, fills in between the dye electrode and the counter electrode to be in electrochemical contact with both of the electrodes. In this solar cell, irradiation of light on the side of the dye electrode 11 allows feeding electrons through the electroconducting film on the side of the dye electrode to outer circuitry.

Next, the mechanism in which photoelectric conversion takes place in a dye-sensitized solar cell will be described. First, absorption of the light energy injected from outside by the sensitizing dye 4 carried on the dye electrode 11 results in generation of electrons and holes on the sensitizing dye. The generated electrons pass through the metal oxide film 3 and reach the electroconducting film 2, through which they are fed to the outside system. On the other hand, the generated holes are transported through the electrolytic solution 5 to the counter electrode 12, where they are recombined with the electrons fed through the electroconducting film 7.

As can be presumed from the mechanism of photoelectric conversion, the photoelectric conversion efficiency of a dye-sensitized solar cell largely depends on the performance of photoactive electrode. To increase the photoelectric conversion efficiency of a dye-sensitized solar cell, the structure and composition of the metal oxide film are particularly important. Specifically, in order for a dye-sensitized solar cell to act stably, it is necessary to keep fine particles of metal oxide which constitutes the photoactive electrode in a state of contacting with each other. This is because contact of metal oxide fine particles with each other allows photo-induced charge-separated electrons on the sensitizing dye to flow in the metal oxide film efficiently. The kind of metal oxide fine particles and degree of adhesion between the fine particles is also assumed to influence the electron conductivity thereof. In addition thereto, it is effective to make the metal oxide film porous. Using the porous film leads to an increase in area per unit volume of the film, so that the carrying amount of sensitizing dye can be increased. This allows effective use of the light injected into the photoelectric conversion element from the outside to photoelectric conversion. Furthermore, another reason of making the metal oxide film porous is that such allows the solution of the electrolytic layer to diffuse all over the metal oxide film, resulting in that the holes generated on the sensitizing dye can be efficiently transported.

In a conventional production method, to produce a photoactive electrode, a method is used in which a metal oxide dispersion composed of a mixture of metal oxide fine particles and an organic substance which is burned out upon heating, specifically a polymer compound having polyethylene glycol or polypropylene glycol as a main chain is coated on a sheet-shaped electrode by a screen printing method, a doctor blade method, a spin coating method or the like, dried and then heat-treated at a temperature at which the metal oxide is sintered (specifically, at a temperature of 400° C. or higher when titanium oxide is taken as an example). According to this method, many voids formed by the burning out of the organic substance remain in the metal oxide film, which can make the metal oxide film porous and which can bind the metal oxide fine particles to each other. That is, in the conventional technique for fabricating a photoactive electrode, the step of heat-treating the metal oxide film coated on the sheet-shaped electrode at a temperature at which the organic substance is burned out is indispensable. From these reasons, production of solar cells by the conventional technique requires a large amount of heat energy and the sheet-shaped electrode used for the photoactive electrode requires heat resistance, so that the practically usable substrate is limited to fluorine-doped tin oxide glass, which has the feature of high heat resistance but is expensive, heavy and poor in shape freedom. In other words, in accordance with the conventional method, it is difficult to fabricate dye-sensitized solar cells with a substrate of sheet-shaped electrode which is light in weight, inexpensive and flexible, for example, a resin, etc., while maintaining an acceptable photoelectric conversion efficiency or with a sheet-shaped electrode having indium tin oxide as inexpensive electroconducting film.

For the purpose of imparting freedom in shape to dye-sensitized solar cells, there have been several reports on the technique of fabricating dye-sensitized solar cells using sheet-shaped electrode made of a material other than fluorine-doped tin oxide glass, in particular a material having freedom in shape, as a substrate therefore.

For example, there have been reported a method involving sintering a metal oxide at a high temperature by using a metal foil having heat resistance as a sheet-shaped electrode (for example, JP 11-288745 A) and a method involving an anodization or chemical oxidation method (for example, JP 10-112337 A). However, when dye-sensitized solar cells with sheet-shaped electrodes composed of these metal substrates are used, light must be introduced from the side of counter electrode because the metal substrates are opaque. As a result, they have disadvantages of a great decrease in photoelectric conversion efficiency in that the electrolytic layer absorbs most part of light to cause a great energy loss and that the most part of photoelectrons is generated at sites remotest from the sheet-shaped electrode of metal oxide film, so that photoelectrons are restricted in their movement due to electric resistance of the metal oxide. Furthermore, the substrate of the sheet-shaped electrode which can endure corrosion by iodine used as an electrolyte of the dye-sensitized solar cell is limited to expensive metals such as titanium, tantalum, and niobium, so that the dye-sensitized solar cells produced by these methods become expensive.

There has been also a report on the technique of performing sintering of a metal oxide at a low temperature using a flexible resin as a substrate of the sheet-shaped electrode (for example, B. A. Gregg et al., Langmuir, 2000, Vol. 16, 5626). In this case, a resin which is less expensive, more transparent and further endurable to corrosion by the electrolyte than the above-mentioned metals can be used as a substrate of the sheet-shaped dye electrode and hence a dye-sensitized solar cell which takes advantage of the feature of a resin substrate and has high performance is expectable. By this method, formation of dense metal oxide film at low temperatures allows adhesion of metal oxide fine particles to each other without practicing heat treatment at high temperatures. However, since this method fails to make the metal oxide film porous, the fabricated photoactive electrode has a problem in that it has greatly decreased performance as compared with the conventional porous photoactive electrode which is fabricated by the conventional high temperature heat treatment.

Even if a porous metal oxide film were formed by this method, adhesion between the metal oxide fine particles would be insufficient because of absence of sintering treatment at high temperatures and thus the mechanical strength of the metal oxide film would be insufficient. Therefore, it is expected that slight mechanical vibration which the metal oxide electrode receives, temperature variation which the cell is susceptible to or the like deteriorates contact between the metal oxide fine particles. That is, the dye electrode fabricated by this method will not be able to maintain the performance for a long time.

In the case where sintering is performed at low temperatures, the kind of metal oxide also gives a great influence on the performance. Taking titanium oxide as an example, one produced by a method which is called as a wet method generally used for dye-sensitized solar cells, for example, titanium oxide produced through hydrolysis of a metal alkoxide and supplied in the form of a solvent dispersion, is not suitable for the case where sintering is performed at low temperatures. This is because organic substances used in the production process are adsorbed and remain on the surface of such metal oxide fine particles, which deteriorates contact between the fine particles, so that movement of electrons are not performed smoothly, resulting in decreased performance. On the other hand, when the photoactive electrode is sintered at high temperatures, this problem does not occur. This is presumably because the adsorbed organic substances are removed from the surface of the metal oxide fine particles by heating at 200° C. or more, resulting in contact between the fine particles (for example, K. Murakoshi et al., J. Electroanal. Chem., 1995, Vol. 396, 26).

DISCLOSURE OF THE INVENTION

Therefore, an object of the present invention is to provide a method for producing a photoactive electrode for dye-sensitized solar cells capable of forming a porous metal oxide film on a sheet-shaped electrode without using high temperatures.

Another object of the present invention is to provide a dye-sensitized solar cell which is light in weight, flexible and inexpensive having a substrate of a sheet-shaped electrode (for example, a resin which is highly transparent, inexpensive, and light in weight and which has freedom in shape) or an electroconducting film (for example, indium tin oxide) which have not been able to maintain the performance thereof in high temperature heat treatment as conducted in the production process of conventional dye-sensitized solar cells.

As a result of extensive studies with a view to achieving the above-mentioned objects, the inventors of the present invention have found that by coating a metal oxide dispersion composed of metal oxide fine particles, a small amount of a specific polymer binder, and a solvent on a sheet-shaped electrode and then evaporating the solvent, a state where the metal oxide fine particles are bound to each other with the binder can be maintained, that where titanium oxide is used as the metal oxide, one that is produced by a gas phase method is particularly preferable, and that by adopting a spraying method when coating the metal oxide dispersion on the sheet-shaped electrode, porosity of the metal oxide film is increased, thereby achieving the present invention.

That is, the present invention provides the following metal oxide dispersion for dye-sensitized solar cells, photoactive electrode for dye-sensitized solar cells using the metal oxide dispersion and production method therefor, and dye-sensitized solar cell with the photoactive electrode.

1. A metal oxide dispersion for a dye-sensitized solar cell, comprising metal oxide fine particles, a binder and a solvent.
2. The metal oxide dispersion for a dye-sensitized solar cell as, described in 1 above, wherein the binder is a polymer compound.
3. The metal oxide dispersion for a dye-sensitized solar cell as described in 2 above, wherein the polymer compound is a polymer compound having no hydroxyl group nor amino group.
4. The metal oxide dispersion for a dye-sensitized solar cell according to 2 or 3 above, wherein the polymer compound is a polymer compound having N-vinylacetamide or acrylamide as a monomer unit.
5. The metal oxide dispersion for a dye-sensitized solar cell as described in 2 or 3 above, wherein the polymer compound is a polymer compound containing a fluorine atom.
6. The metal oxide dispersion for a dye-sensitized solar cell as described in 4 above, wherein the polymer compound is at least one member selected from the group consisting of poly(N-vinylacetamide), polyacrylamide, N-vinylacetamide/sodium acrylate copolymer, acrylamide/sodium acrylate copolymer, and polytetrafluoroethylene.
7. The metal oxide dispersion for a dye-sensitized solar cell as described in 1 above, wherein the metal oxide fine particles contain titanium oxide.
8. The metal oxide dispersion for a dye-sensitized solar cell as described in 7 above, wherein the titanium oxide is one subjected to heat treatment at 200° C. or more in a powder state.

9. The metal oxide dispersion for a dye-sensitized solar cell as described in 7 above, wherein the titanium oxide has a BET specific surface area of 10 to 100 m²/g.
10. The metal oxide dispersion for a dye-sensitized solar cell as described in 9 above, wherein the titanium oxide has a BET specific surface area of 20 to 75 m²/g
11. The metal oxide dispersion for a dye-sensitized solar cell as described in 8 above, wherein the titanium oxide has a 90% cumulative weight particle size distribution diameter, D90, of 2.2 μm or less.
12. The metaloxide dispersion for a dye-sensitized solar cell as described in 8 above, wherein the titanium oxide has a distribution constant, n, according to the following Rosin-Rammler equation of 1.7 or more $$R=100\exp\{\times(D/De)^n\} \quad (1)$$

(wherein D represents particle diameter, R is a mass percentage of particles having a particle diameter greater than D (particle diameter) to total particles, De is a particle size characteristic number, and n is a distribution constant).
13. The metal oxide dispersion for a dye-sensitized solar cell as described in 7 above, wherein the titanium oxide contains one produced by a gas phase method in which titanium tetrachloride is oxidized at a high temperature with an oxidizing gas.
14. The metal oxide dispersion for a dye-sensitized solar cell as described in 13 above, wherein the titanium oxide contains titanium oxide obtained by a gas phase method in which titanium oxide is produced by oxidizing titanium tetrachloride with an oxidizing gas at a high temperature and wherein a gas containing titanium tetrachloride and the oxidizing gas each are preheated at 500° C. or more and supplied to a reaction tube at a flow rate of 10 m/second or more.
15. The metal oxide dispersion for a dye-sensitized solar cell as described in 14 above, wherein the titanium oxide contains titanium oxide obtained by a gas phase method in which titanium oxide is produced by oxidizing titanium tetrachloride with an oxidizing gas at a high temperature, wherein a gas containing titanium tetrachloride and the oxidizing gas each are preheated at 500° C. or more and supplied to a reaction tube at a flow rate of 10 m/second or more, and wherein the gas containing titanium tetrachloride and the oxidizing gas are allowed to reside and react at a temperature above 600° C. in the reaction tube within 3 seconds.
16. The metal oxide dispersion for a dye-sensitized solar cell as described in 9 above, in addition to the titanium oxide (titanium oxide A) as described in 9 above, further comprising titanium oxide having a BET specific surface area of 100 to 500 m²/g (titanium oxide B).
17. The metal oxide dispersion for a dye-sensitized solar cell as described in 16 above, wherein a mass ratio (B/A) of the titanium oxide B to the titanium oxide A is 0.01 to 0.5.
18. A method for producing a photoactive electrode for a dye-sensitized solar cell, comprising coating the metal oxide dispersion described in any one of 1 to 17 above on a sheet-shaped electrode, and then evaporating the solvent to form a metal oxide film on the sheet-shaped electrode.
19. The method for producing a photoactive electrode for a dye-sensitized solar cell as described in 18 above, wherein the metal. oxide dispersion is coated on the sheet-shaped electrode by using an atomizer.
20. A method for producing a photoactive electrode for a dye-sensitized solar cell, comprising immersing the photoactive electrode comprising a sheet-shaped electrode having thereon a metal oxide film as described in 18 or 19 above in a solution containing at least one of a halide, an alkoxide and a carboxide of a metal that constitutes the metal oxide film and then heat-treating the electrode at a temperature of from 80 to 200° C.
21. A method for producing a photoactive electrode for a dye-sensitized solar cell, comprising heat-treating the photoactive electrode comprising a sheet-shaped electrode having thereon a metal oxide film as described in 18 or 19 above at a temperature of from 100 to 200° C.
22. A photoactive electrode for a dye-sensitized solar cell, which is produced by the production method as described in any one of 18 to 21 above.
23. A photoactive electrode for a dye-sensitized solar cell, comprising a metal oxide film containing a binder and metal oxide fine particles on a sheet-shaped electrode composed of a transparent substrate and a transparent electro-conductive layer.
24. The photoactive electrode for a dye-sensitized solar cell as described in 23 above, wherein the binder is a polymer compound.
25. The photoactive electrode for a dye-sensitized solar cell as described in 24 above, wherein the polymer compound is a polymer compound having no hydroxyl group nor amino group.
26. The photoactive electrode for a dye-sensitized solar cell as described in 25 above, wherein the polymer compound is a polymer compound having N-vinylacetamide or acrylamide as a monomer unit.
27. The photoactive electrode for a dye-sensitized solar cell as described in 25 above, wherein the polymer compound is a polymer compound containing a fluorine atom.
28. The photoactive electrode for a dye-sensitized solar cell as described in 26 above, wherein the polymer compound is at least one member selected from the group consisting of poly(N-vinylacetamide), polyacrylamide, N-vinylacetamide/sodium acrylate copolymer, acrylamide/sodium acrylate copolymer, and polytetrafluoroethylenes.
29. The photoactive electrode for a dye-sensitized solar cell as described in 23 above, wherein the metal oxide fine particles contain titanium oxide.
30. The photoactive electrode for a dye-sensitized solar cell as described in 29 above, wherein the titanium oxide is one subjected to heat treatment at 200° C. or more in a powder state.
31. The photoactive electrode for a dye-sensitized solar cell as described in 29 above, wherein the titanium oxide has a BET specific surface area of 10 to 100 m²/g.
32. The photoactive electrode for a dye-sensitized solar cell as described in 31 above, wherein the titanium oxide has a BET specific surface area of 20 to 75 m²/g.
33. The photoactive electrode for a dye-sensitized solar cell as described in 30 above, wherein the titanium oxide has a 90% cumulative weight particle size distribution diameter, D90, of 2.2 μm or less.
34. The photoactive electrode for a dye-sensitized solar cell as described in 23 above, wherein the titanium oxide has a distribution constant, n, according to the following Rosin-Rammler equation of 1.7 or more $$R=100\exp\{-(D/De)^n\}$$

(wherein D represents particle diameter, R is a mass percentage of particles having a particle diameter greater than D (particle diameter) to total particles, De is a particle size characteristic number, and n is a distribution constant).

35. The photoactive electrode for a dye-sensitized solar cell as described in 29 above, wherein the titanium oxide contains one produced by a gas phase method in which titanium tetrachloride is oxidized at a high temperature with an oxidizing gas.
36. The photoactive electrode for a dye-sensitized solar cell as described in 35 above, wherein the titanium oxide contains titanium oxide obtained by a gas phase method in which titanium oxide is produced by oxidizing titanium tetrachloride with an oxidizing gas at a high temperature and wherein a gas containing titanium tetrachloride and the oxidizing gas each are preheated at 500° C. or more and supplied to a reaction tube at a flow rate of 10 m/second or more.
37. The photoactive electrode for a dye-sensitized solar cell as described in 36 above, wherein the titanium oxide contains titanium oxide obtained by a gas phase method in which titanium oxide is produced by oxidizing titanium tetrachloride with an oxidizing gas at a high temperature, wherein a gas containing titanium tetrachloride and the oxidizing gas each are preheated at 500° C. or more and supplied to a reaction tube at a flow rate of 10 m/second or more, and wherein the gas containing titanium tetrachloride and the oxidizing gas are allowed to reside and react at a temperature above 600° C. in the reaction tube within 3 seconds.
38. The photoactive electrode for a dye-sensitized solar cell as described in 31 above, in addition to the titanium oxide (titanium oxide A) as described in 31 above, further comprising titanium oxide having a BET specific surface area of 100 to 500 m$^2$/g (titanium oxide B).
39. The photoactive electrode for a dye-sensitized solar cell as described in 38 above, wherein a mass ratio (B/A) of the titanium oxide B to the titanium oxide A is 0.01 to 0.5.
40. The photoactive electrode for a dye-sensitized solar cell as described in 23 above, wherein the transparent substrate comprises a polymer compound having sunlight permeability.
41. The photoactive electrode for a dye-sensitized solar cell as described in 40 above, wherein the polymer compound having sunlight permeability is one selected from polyester, polyolefin, and polyamide.
42. A dye-sensitized solar cell comprising a dye electrode composed of the photoactive electrode as described in any one of 23 to 41 above and a sensitizing dye being carried on a metal oxide film of the photoactive electrode, a counter electrode having a catalytic action and electroconductivity of which an electroconductive surface faces the metal oxide film of the dye electrode, and an electrolytic solution filled in between the electrodes.
43. A dye-sensitized solar cell comprising the photoactive electrode as described in 22 above.

DETAILED DESCRIPTION OF THE INVENTION

Hereinafter, the present invention will be described in detail.

The first aspect of the present invention relates to a metal oxide dispersion for a dye-sensitized solar cell, comprising metal oxide fine particles, a binder and a solvent.

Here, the "metal oxide" refers to a metal oxide which is usable in dye-sensitized solar cells, for example, titanium oxide, niobium oxide, tin oxide, zinc oxide, magnesium oxide, indium oxide, zirconium oxide, strontium titanate, barium titanate, either singly or as mixtures of two or more of them. Furthermore, the "fine particles" refers to particles having a specific surface area of 5 to 500 m$^2$/g as measured by, for example, a BET specific surface area measuring method with nitrogen. Metal oxide fine particles satisfying such conditions include, for example, titanium oxide having a specific surface area within the range of 10 to 100 m$^2$/g and, for example, a mixture of tin oxide having a specific surface area within the range of from 5 to 150 m$^2$/g and zinc oxide having a specific surface area within the range of from 5 to 150 m$^2$/g, etc. The metal oxide fine particles may be used either in a dry state or in a state of being dispersed in a solvent.

The use amount of the metal oxide fine particles is preferably from 5 to 60 mass %, and more preferably from 10 to 40 mass % in the metal oxide dispersion. Where titanium oxide is used for the metal oxide fine particles, preferably it has high crystallinity and contains anatase type crystal and also it is preferred that the titanium oxide has no organic substance adsorbed on the surface thereof. Specifically, titanium oxide produced by a gas phase method in which titanium tetrachloride is oxidized at a high temperature with an oxidizing gas is preferably used in the present invention. The one produced by a wet method may also be used if it is heat-treated at a temperature of 200° C. or more to remove the organic substance adsorbed on the surface thereof after the solvent is once removed. When a decrease in mass is measured upon heat treatment, the removal of an organic substance can be confirmed at a point in time when the decrease in mass stops within the range of 200 to 400° C.

Next, the production method for titanium oxide in gas phase will be described.

The mechanism of growth of particles in a gas phase method is roughly classified into two types. One is CVD (chemical vapor deposition) and the other is growth due to collision (coalescence) or sintering of particles. To obtain ultrafine particulate titanium oxide as aimed at by the present invention, the both types of growth must proceed in short times. That is, in the former growth, the growth can be suppressed by increasing the preheating temperature to a high level to increase chemical reactivity (reaction rate) or the like. In the latter growth, the growth due to sintering or the like can be suppressed by performing cooling, dilution, etc. as rapidly as possible after completion of CVD to make the high temperature residence time of gases as short as possible.

The gas containing titanium tetrachloride serving as a raw material has a titanium tetrachloride concentration in the gas of preferably from 10 to 100% and more preferably from 20 to 100%. When a gas having a titanium tetrachloride concentration of 10% or more is used as a raw material, many homogeneous nuclei are generated or the reactivity becomes high, so that CVD-governed grown particles are difficult to be formed, thereby giving particles with a narrow particle size distribution.

The gas which dilutes titanium tetrachloride in the gas containing titanium tetrachloride must be selected from those which do not react with titanium tetrachloride and which are not oxidized. Preferred examples of dilution gas include nitrogen and argon.

The preheating temperature for the gas containing titanium tetrachloride and the oxidizing gas must be 500° C. or more, and preferably 800° C. or more. When the preheating temperature is below 500° C., there occurs less homogeneous nucleation and the reactivity is low, so that the obtained particles will have a broad particle size distribution.

The flow rates of the gas containing titanium tetrachloride and of the oxidizing gas when they are introduced into a reaction tube are preferably 10 m/second or more. This is because increased flow rates will promote mixing of the both gases. Where the temperature of gases introduced into the reaction tube is 500° C. or more, the reaction is completed simultaneously with mixing, so that homogeneous nucleation is promoted and the zone where CVD-governed grown particles are formed can be shortened.

In the present invention, it is preferred that the raw material gases are introduced into the reaction tube so that the gases introduced into the reaction tube can be sufficiently mixed. The fluid state of the gases in the reaction tube is not particularly limited so far as the gases can be sufficiently mixed. Preferably, it is a fluid state where a turbulent flow occurs. Also, a swirled flow may be present.

As nozzles through which the raw material gases are introduced into the reaction tube, those nozzles which give a concentric parallel flow, an inclined flow, a cross flow, etc. are adopted. However, the present invention is not limited thereto. Generally, concentric parallel flow nozzles are poor in the degree of mixing as compared with those nozzles which give rise to an inclined flow or cross flow but are preferably used from viewpoint of design since they are of a simple structure.

In the case of, for example, concentric parallel flow nozzles, the gas containing titanium tetrachloride is introduced into an inner tube. However, from the viewpoint of ease of mixing gases, the diameter of inner tube is preferably 50 mm or less.

In the present invention, to completely perform mixing of gases, it is preferred that the flow rates of gases introduced in the reaction tube are high; in particular, an average flow rate of 5 m/second or more is preferable. When the flow rates of gases in the reaction tube are 5 m/second or more, mixing in the reaction tube can be sufficiently performed, which results in generation of CVD-governed grown particles in a small amount and no generation of particles having a broad particle size distribution.

The reaction in the reaction tube is an exothermic reaction and the reaction temperature becomes higher than the sintering temperature of ultrafine particulate titanium oxide. Although some heat dissipation occurs from the reactor, the sintering of produced fine particles will proceed after the reaction to form grown particles unless the fine particles are quenched. In the present invention, it is preferred that the high temperature residence time at above 600° C. in the reaction tube be set to 3 seconds or less and thereafter quenching be performed.

As means for quenching the particles after the reaction, a method of introducing a large amount of a gas such as cooled air or nitrogen into the mixture after the reaction, a method of spraying water thereto, or the like may be adopted.

Titanium oxide preferably contains anatase type titanium oxide or brookite type titanium oxide. Furthermore, titanium oxide has a BET specific surface area of preferably from 10 to 100 m$^2$/g, and more preferably from 20 to 75 m$^2$/g. Preferably, the particle size distribution of titanium oxide is sharp. The procedure of measuring the particle size of titanium oxide will be specifically described hereinbelow.

A slurry of 0.05 g titanium oxide in 50 ml of deionized water and 100 µl of 10% sodium hexametaphosphate is irradiated with supersonic wave (46 KHz, 65 W) for 3 minutes. The slurry is charged in a laser diffraction particle size distribution measuring apparatus (Shimadzu Corporation, SALD-2000J) to measure particle size distribution. If the value of 90% cumulative weight particle size distribution diameter, D90, in the thus measured particle size distribution is small, the slurry is judged to have good dispersibility in hydrophilic solvents. In the present invention, 90% cumulative weight particle size distribution diameter, D90, of titanium oxide as measured by the laser diffraction based particle size distribution measuring method is preferably 2.2 µm or less.

Furthermore, homogeneity of particle size of titanium oxide can be defined by distribution constant (n) of Rosin-Rammler equation. Hereinafter, a brief description will be made on the Rosin-Rammler equation, details of which are described in Ceramics Engineering Handbook (ed. by The Ceramics Society of Japan, corporate body, first edition) p. 59-62 and 596-598.

Rosin-Rammler equation is expressed by formula (1) below.

$$R=100\exp\{-(D/De)^n\} \quad (1)$$

wherein D represents particle diameter, R is a mass percentage of particles having a particle diameter greater than D (particle diameter) to total particles, De is a particle size characteristic number, and n is called a distribution constant which indicates a particle diameter corresponding to R=36.8 (%).

Transformation of the formula (1) gives rise to the following formula (2)

$$\log\{\log(100/R)\}=n\log D+C \quad (2)$$

wherein C represents a constant (C=log·log e−n log De) From the formula (2) above, plotting the relationship between log D and log{log (100/R)} in a Rosin-Rammler (RR) graph with scales of log D in the x-axis and of log {log (100/R)} in the y-axis results in an almost a straight line. The inclination (n) of the straight line represents the degree of homogeneity of particle size, and the greater the value n is, the narrower the particle distribution is judged to be.

The distribution constant, n, in the Rosin-Rammler equation for titanium oxide in the present invention is preferably 1.7 or more.

Where the above-mentioned titanium oxide (titanium oxide A) is used as the metal oxide fine particles, for the purpose of increasing the specific surface area per unit volume of the metal oxide film while maintaining its pores, it is preferred to use another type of titanium oxide (titanium oxide B) having a specific surface area of from 100 to 500 nm in combination within the range of mass ratio (B/A) of from 0.01 to 0.5.

The binder means a substance which can when added in small amounts play a role of fixing the metal oxide fine particles in a state of contact with each other even after the solvent of the metal oxide fine particle dispersion is removed. Therefore, any substances which have such a function can be used without any limitation. Specific examples thereof include poly(N-vinylacetamide), N-vinylacetamide/sodium acrylate copolymer, N-vinylacetamide/acrylamide copolymer, polyacrylamide, acrylamide/sodium acrylate copolymer, poly(N-vinylformamide), and polytetrafluoroethylene, tetrafluoroethylene/polypropylene fluoride copolymer, tetrafluoroethylene/polyfluoroalkyl vinyl ether copolymer, polyvinyl fluoride, polyvinylidene fluoride, styrene/butadiene copolymer, polyvinylpyridine, vinylpyridine/methyl methacrylate copolymer, and polyvinylpyrrolidone, taken singly or as mixtures thereof. Among these, poly(N-vinylacetamide), polyacrylamide, N-vinylacetamide/sodium acrylate copolymer, acrylamide/sodium acrylate copolymer, and polytetrafluoroethylene are preferable. Furthermore, the binder has higher performance according as it has a higher molecular weight. Specifically, the mass average molecular weight of the binder is preferably 500 or more, and more preferably 10,000 or more. Use amount of the binder is advantageously as small as possible so far as the binder exhibits bindability. Specifically, it is preferred to add from 0.01 to 20 mass parts and more preferably from 0.1 to 10 mass parts, of the binder per 100 mass parts of the metal oxide fine particles. Preferably, the binder contains no functional group (that is, a hydroxyl group or an amino group) that causes a sensitizing dye to be prevented from being carried on the metal oxide. Specifically, polyvinyl alcohol, polyamine, etc. are not preferable since such might lower the performance of the electrode.

As the solvent to used for the dispersion, any volatile liquids may be used without any limitation so far as it can promote the mixing of the metal oxide fine particles and the binder by dispersing metal oxide fine particles and at the same time dispersing, dissolving or swelling the binder. Specifically, volatile liquids having a hydroxy group, a carboxyl group, a ketone group, an aldehyde group, an amino group, or an amido group in the skeleton thereof are preferred. For example, water, methanol, ethanol, butanol, methyl cellosolve, ethylene glycol, acetic acid, acetylacetone, turpentine oil, and methylpyrrolidone may be used singly or as mixtures thereof.

As a method for producing metal oxide dispersion with metal oxide fine particles, a binder and a solvent, a general dispersion method may be used. Specific examples thereof include a mortar, a paint conditioner, a homogenizer, a supersonic wave stirrer, etc.

According to a second aspect, the present invention relates to a method for producing a photoactive electrode for a dye-sensitized solar cell, comprising coating the metal oxide dispersion according to the first aspect of the present invention on a sheet-shaped electrode, and then evaporating the solvent to form a metal oxide film on the sheet-shaped electrode.

Here, it is preferred that the metal oxide dispersion be coated on the sheet-shaped electrode by use of a spraying apparatus. Any type of spraying apparatus may be used without limitation so far as it can form a spray of the dispersion of the present invention having a particle diameter of 200 μm or less. Specific examples thereof include an atomizer, that is, an apparatus which scatters a liquid in a predetermined direction by making use of a pressure difference generated by expansion of a compressed gas, an ink jet apparatus, that is, an apparatus for discharging a liquid as fine particles by subjecting fine nozzles filled with the liquid to volume contraction or temperature elevation, or a supersonic wave atomizer, that is, an apparatus for scattering a liquid in a form of spray by irradiating supersonic wave to the liquid, etc. Any commercial products of these may be used without any particular limitation. A porous metal oxide film free of cracks and peeling off from a sheet-shaped electrode can be formed by feeding these apparatuses with the metal oxide dispersion according to the first aspect of the present invention and spraying it onto the sheet-shaped substrate to form a metal oxide film thereon, and then evaporating the solvent.

Here, "evaporating the solvent" means removing the solvent contained in the metal oxide dispersion from the metal oxide dispersion forming a film on the sheet-shaped electrode to obtain a solidified metal oxide film. Therefore, any drying process may be used so far as it is an operation which dries the coating. For example, a method of blasting dry air to the coating, a method of blasting warm air to the coating by a drier or the like, a method of irradiating infrared rays to the coating, a method of elevating the temperature of the sheet-shaped electrode, etc. are preferred since the treatment can be performed in a short time. In this case, however, the upper limit of heat to be applied to the sheet-shaped electrode must be identical to the lower one of either the upper limit temperature at which the binder can maintain its physical properties or heat resistant temperature of the material of the substrate of the sheet-shaped electrode. Specifically, the range of from room temperature to 200° C. is preferable. The "heat resistant temperature" as used herein refers to the lowest temperature at which the phenomenon such as irreversible deformation, discoloration, decrease in mechanical characteristics or decomposition occurs to the substrate. Where a conventional resin is used as a substrate, the softening temperature or decomposition temperature of the resin corresponds to this.

According to a third aspect, the present invention relates to a method for producing a photoactive electrode for a dye-sensitized solar cell, comprising immersing the photoactive electrode comprising a sheet-shaped electrode having thereon a metal oxide film as obtained according to the second aspect of the present invention in a solution containing at least one of a halide, an alkoxide and a carboxide of a metal that constitutes the metal oxide film and then heat-treating it at a temperature of from 80 to 200° C.

By this method, the adhesion between the metal oxide fine particles can be increased and thus the performance of the photoactive electrode can be improved.

As the halide, alkoxide and carboxide of the metal which constitutes the metal oxide film as referred to herein, there may be used titanium fluoride, titanium chloride, titanium tetraisopropylalkoxide, etc. where the metal oxide film is composed of titanium oxide; indium chloride, indium acetate, etc. where the metal oxide film is composed of indium oxide; zinc chloride, zinc acetate, tin chloride, etc. where the metal oxide film is composed of a mixture of tin oxide and zinc oxide.

The "solution" as used herein refers to these compounds diluted with a solvent such as water, alcohol, halogen or ether to a concentration of from 0.01 to 10 mol/l. As the solvent, water, methanol, ethanol, propanol, or butanol is preferred. The reason why the heat treatment is performed is to promote dehydrocondensation of hydrolysate obtained after the hydrolysis of the halide, alkoxide or carboxide of the metal which constitutes the metal oxide with the moisture in the atmosphere. Therefore, the lower limit of the heat treatment temperature is preferably 80° C. However, temperatures lower than that may also be used, for example, by leaving the solution to stand in the atmospheric air for one day or more. The upper limit of the heat treatment temperature is limited to the temperature at which the performance of the binder in the metal oxide dispersion and the performance of the sheet-shaped electrode can be maintained as described above.

According to a fourth aspect, the present invention relates to a method for producing a photoactive electrode for a dye-sensitized solar cell, comprising heat-treating the photoactive electrode comprising a sheet-shaped electrode having thereon a metal oxide film at a temperature of from 100 to 200° C.

In this process, removal of moisture adsorbed on the photoactive electrode is aimed at. The photoactive electrode of the present invention in a state where it is left to stand in a room contains moisture corresponding to 5 to 20% of the mass of the metal oxide. The moisture is preferably removed since it prevents a sensitizing dye from being carried on the photoactive electrode in the step of carrying the sensitizing dye. Therefore, although it is preferable that the lower limit of the heat treatment temperature is 100° C., temperature below 100° C. may be employed in a case where the electrode is left to stand in dry atmosphere or under reduced pressure. With respect to the upper limit of the heat treatment temperature, the higher, the more preferred, so far as no phenomenon such as irreversible deformation, discoloration, decrease in mechanical characteristics or decomposition occurs to the substrate.

As a method for confirming that the moisture has been removed from the surface of the photoactive electrode, the removal of moisture can be estimated by measuring a change in mass as a function of conditions of heat treatment to the photoactive electrode.

The photoactive electrode thus heat-treated must be stored under dry atmosphere or a next step (carrying dye by the sensitizing dye) must be performed immediately so that moisture should not be adsorbed again on the surface thereof.

According to a fifth aspect, the present invention relates to a photoactive electrode for a dye-sensitized solar cell, comprising a sheet-shaped electrode composed of a transparent substrate and a transparent electrode layer, produced by the method according to the second, third or fourth aspect of the present invention and a metal oxide film containing a binder and metal oxide fine particles on the sheet-shaped electrode.

Here, it is preferred that the sheet-shaped electrode has an electrical resistance of 2,000 Ω/□ (square) or less and a sunlight permeability of 30% or more. Specifically, it refers to a transparent substrate (glass or resin material) having a transparent electroconducting layer of indium tin oxide, zinc oxide, fluorine-doped tin oxide, or the like on the surface thereof. Here, the feature of the present invention is that the metal oxide fine particles which constitute the metal oxide film are kept in an electrical contact with each other by the coexistent binder.

As the above-mentioned transparent substrate, any material may be used without limitation so far as the electroconducting layer and metal oxide film formed thereon can be stably maintained and at the same time the material have transparency to sunlight. Polymer compounds having transparency to sunlight are preferable. Specific examples thereof include polyester, polyolefin, and polyamide (nylon-6, etc.). The film thickness of the transparent substrate is preferably from 0.005 to 10 mm, and more preferably from 0.05 to 1 mm. The sunlight permeability of the transparent substrate to sunlight is preferably 50% or more on the average to light having a wavelength of from 300 to 800 nm.

According to a sixth aspect, the present invention relates to a dye-sensitized solar cell, comprising a dye electrode composed of the photoactive electrode according to the fourth or fifth aspect of the present invention having thereon a metal oxide film whose surface carries a sensitizing dye and faces a counter electrode having a catalyst action and electroconductivity, with an electrolytic solution filling in between the dye electrode and the counter electrode.

Here, as the sensitizing dye to be carried on the surface of the metal oxide film, a wide variety of dyes used in dye-sensitized solar cells can be employed. Specifically, ruthenium bipyridinium complexes, xanthene dyes, merocyanine dyes, porphyrin derivatives, phthalocyanine derivatives, etc. may be used. The method for carrying the sensitizing dye on the photoactive electrode is performed by a generally employed method including immersing the photoactive electrode in a solution of the sensitizing dye dissolved in an alcohol. As the "counter electrode" referred to herein, any material that has an electrical resistance of 2,000 Ω/□ (square) or less and a catalyst action regardless of whether it is transparent or opaque may be used without any limitation. The "catalyst action" as used herein refers to an action by which the electrolyte oxidized on the photoactive electrode is reduced on the counter electrode without generating an overvoltage. Specifically, platinum, ruthenium, graphite, and carbon black have this function. Therefore, it is necessary that any one of or a plurality of these components are present on the portion that contacts the electrolytic layer of the counter electrode. Examples of the counter electrode include carbon fiber, carbon black, or graphite kneaded with polytetrafluoroethylene, tetrafluoroethylene/polypropylene fluoride copolymer, tetrafluoroethylene/polyfluoroalkyl vinyl ether copolymer, polyvinylidene fluoride, polyethylene fluoride, styrene/butadiene rubber or the like and then molded into the form of a sheet, or ruthenium mesh, platinum plate, platinum fiber, electrode having carried platinum on the surface thereof, and the like. The techniques for use in fabricating them include generally employed methods such as a mixing method, a vapor deposition method, an electrochemical technique, and a chemical reaction technique.

The electrolytic solution used for the electrolytic layer is not particularly limited so far as it is usable in conventional dye-sensitized solar cells. Specific examples thereof include tetrabutylammonium iodide, lithium iodide, methylethylimidazolium iodide, methylpropylimidazolium iodide, and solutions of iodine dissolved in aprotic polar solvents, for example, acetonitrile, ethylene carbonate, methoxypropionitrile, and propylene carbonate.

BEST MODE FOR CARRYING OUT THE INVENTION

Hereinafter, examples of dye-sensitized solar cell according to embodiments of the present invention will be shown. However, the present invention should not be considered to be limited to the following examples.

<Measuring Method for Photovoltaic Force>

By using xenon lamp (SEL033, 150 Wxenon lamp, manufactured by Yamashita Denso Corporation) as a light source, 50 mW/cm$^2$ (light amount was quantitated by using IL1400A, manufactured by International Light Inc.) was irradiated to the fabricated dye-sensitized solar cell. The maximum electromotive force in this instance was measured by using a potentiostat (HAB151, manufactured by Hokuto Denko Corporation).

EXAMPLE 1

In a mortar, 100 g of titanium oxide (P25, manufactured by Nippon Aerosil Co., Ltd.; titanium oxide prepared by a gas phase method; $D_{90}$=3.1 μm; distribution constant n=1.4), 0.5 gof poly (N-vinylacetamide) (VIAC GE-191, manufactured by Showa Denko K. K.), and 400 g of water were dispersed to obtain a metal oxide dispersion. This was coated on a glass electrode (CS-4S230, glass with a fluorine-doped tin oxide film, manufacturedby Nippon Sheet Glass Co., Ltd.) by a doctor blading method (using a 40 μm applicator) and then left to stand in a room for 2 hours to obtain a photoactive electrode having a film thickness of 6 μm. Then, this was immersed in an ethanol solution of ruthenium complex dye (RuL$_2$(NCS) 2 manufactured by Kojima Chemical Reagents, Inc.) for 3 hours to obtain a dye electrode. An excess of metal oxide film on the dye electrode was scraped off with a cutter knife so that the metal oxide film had a size of 5×5 mm. On the other hand, platinum having a thickness of 0.1 μm was carried on another glass electrode of the same kind as described above by using a sputtering apparatus to fabricate a counter electrode. The counter electrode was superposed on the dye electrode so that active surfaces of the both electrodes faced each other and the sides of the glass electrodes were sealed with epoxy resin (Bondquick 5, manufactured by Konishi Co., Ltd. Incorporated). The thickness of the electrolytic layer (about 40 μm) was adjusted by inserting a tape-form spacer between the both ends of the two electrodes. Then, an electrolytic solution (acetonitrile solution containing 0.5 mol/l lithium iodide and 0.05 mol/l iodine) was injected in the space between the two electrodes through a micro hole preliminarily provided in the glass electrode to obtain a dye-sensitized solar cell. The injection port was sealed with epoxy resin in the same manner as in the case of the sides. This solar cell had a photovoltaic force of 3.4 mW/cm$^2$.

EXAMPLE 2

A dye-sensitized solar cell was fabricated in the same manner as in Example 1 except that in the metal oxide dispersion, 0.1 g of N-vinylacetamide/sodium acrylate copolymer (VIAC GE-195, manufactured by Showa Denko K. K.) was used in place of poly(N-vinylacetamide). This solar cell had a photovoltaic force of 3.3 mW/cm$^2$.

EXAMPLE 3

A dye-sensitized solar cell was fabricated in the same manner as in Example 1 except that in the metal oxide dispersion, 1 g of polytetrafluoroethylene (F-104, manufactured by Daikin Industries, Ltd.) was used in place of poly(N-vinylacetamide) and 400 g of methylcellosolve was used in place of water as a solvent. This solar cell had a photovoltaic force of 2.8 mW/cm$^2$.

COMPARATIVE EXAMPLE 1

A dye-sensitized solar cell was fabricated in the same manner as in Example 1 except that in the metal oxide dispersion nopoly(N-vinylacetamide) was added. In this case, however, the metal oxide film was brittle so that a portion of the metal oxide filmpeeled off from the glass electrode during the process until a solar cell was completed. Thus, a solar cell with a partially peeled metal oxide film was fabricated. This solar cell had a photovoltaic force of 1.0 mW/cm$^2$.

COMPARATIVE EXAMPLE 2

The metal oxide dispersion in Comparative Example 1 was coated on a glass electrode in the same manner as in Example 1. Then, this was left to stand in air at 470° C. for 1 hour to obtain aphotoactive electrode. Subsequently, adye-sensitized solar cell was fabricated in the same manner as in Example 1. This solar cell had a photovoltaic force of 3.8 mW/cm$^2$.

COMPARISON BETWEEN EXAMPLES 1-3 AND COMPARATIVE EXAMPLES 1-2

In Examples 1-3 in which metal oxide dispersions containing a binder were used, mechanically stable metal oxide films were obtained even without performing high temperature treatment of films. In contrast, in Comparative Example 1, the metal oxide film was found to be too brittle to be suitably put into practical use. Furthermore, it was confirmed that the dye-sensitized solar cells of Examples 1-3 had performance close to that of the cell of Comparative Example 2 which was obtained through conventional high temperature treatment.

EXAMPLE 4

The photoactive electrode fabricated in the same manner as in Example 1 was immersed in a 0.2 mol/l ethanol solution of titanium chloride for 1 minute and then left to stand in the air at 140° C. for 5 minutes. Subsequently, a dye-sensitized solar cell was fabricated in the same manner as in Example 1. This solar cell had a photovoltaic force of 3.6 mW/cm$^2$.

COMPARISON BETWEEN EXAMPLE 1 AND EXAMPLE 4

It is apparent that in Example 4, in which the photoactive electrode was immersed in a solution of a halide (titanium chloride) of the metal oxide (titanium oxide) which constituted the metal oxide film, photovoltaic force was increased as compared with Example 1 in which no such a treatment was performed.

EXAMPLE 5

The metal oxide dispersion used in Example 1 was coated on a glass electrode (CS-4S230, glass with a fluorine-doped tin oxide film, manufactured by Nippon Sheet Glass Co., Ltd.) by using a spray (air brush manufactured by Bumpodo; nozzle diameter 0.2 mm; air pressure 2 kg/cm$^2$). In this instance, during the coating, warm air was blown to the glass electrode by using a hair drier. Thus, a photoactive electrode having a film thickness of 6 μm was obtained. Subsequently, a dye-sensitized solar cell was fabricated in the same manner as in Example 1. This solar cell had a photovoltaic force of 3.8 mW/cm$^2$.

In Example 5 in which the metal oxide film was fabricated by a spraying method, improvement in performance was observed. This would be attributable to formation of porous metal oxide film.

EXAMPLE 6

A dye-sensitized solar cell was fabricated in the same manner as in Example 1 except that a transparent resin electrode (Q-3R-IIX, manufactured by Nakai Industries, Co., Ltd.; a polyethylene terephthalate plate having an indium tin oxide film on the surface thereof) was used in place of the glass electrode. This solar cell had a photovoltaic force of 2.9 mW/cm$^2$.

COMPARATIVE EXAMPLE 3

Fabrication of a dye-sensitized solar cell in the same manner as in Comparative Example 1 by using a transparent resin electrode (Q-3R-IIX, manufactured by Nakai Industries, Co., Ltd.; a polyethylene terephthalate plate having an indium tin oxide film on the surface thereof) in place of the glass electrode was attempted. However, in the operation of carrying a sensitizing dye on the photoactive electrode, the metal oxide film was entirely peeled off, so that no dye-sensitized solar cell could be fabricated.

COMPARISON BETWEEN EXAMPLES 1, 6 AND COMPARATIVE EXAMPLE 3

The cell of Example 6 obtained in the same manner as in Example 1 except that the electrode substrate was resin exhibited equivalent performance to that of the cell of Example 1. Therefore, it was confirmed that a flexible cell could be fabricated by this technique. On the other hand, in Comparative Example 3, fabrication of a cell using a resin by a conventional method was attempted. However, the metal oxide did not maintain its mechanical strength, so that no cell could be fabricated.

EXAMPLE 7

In Example 1, immediately after 10 minutes' heat treatment of the photoactive electrode in air atmosphere on a hot-plate heated to 120° C., carrying of a sensitizing dye on the photoactive electrode was performed with a ruthenium complex dye to fabricate a dye electrode. By using this, a dye-sensitized solar cell was obtained in the same manner as in Example 1. This solar cell had a photovoltaic force of 3.6 mw/cm$^2$.

In Example 7 in which before performing carrying of the sensitizing dye on the photoactive electrode, the moisture adsorbed on the photoactive electrode was removed, improvement in performance as compared with Example 1 was observed.

EXAMPLE 8

A gas containing titanium tetrachloride obtained by mixing 8.3 Nm$^3$/hour of gaseous titanium tetrachloride and 6 Nm$^3$/hour of nitrogen was preheated to 800° C. and oxidizing gas obtained by mixing 2 Nm$^3$/hour of oxygen and 15 Nm$^3$/hour of steam was preheated to 900° C. and introduced into a reaction tube at flow rates of 50 m/second and 35 m/second, respectively, through a concentric parallel flow nozzle. The inner diameter of the concentric parallel flow nozzle was 20 mm and the gas containing titanium tetrachloride was introduced into the inner tube.

The inner diameter of the reaction tube was 100 mm and the flow rate in the pipe at a reaction temperature of 1,200° C. was calculated to be 8 m/second. After the reaction, cooling air was introduced into the reaction tube so that the high temperature residence time in the reaction tube was 0.2 second or less. Thereafter, ultrafine powder was collected by using a Teflon-made bug filter.

The obtained ultrafine particulate titanium oxide had a BET specific surface area of 48 m$^2$/g. The obtained ultrafine particulate titanium oxide was measured for particle size distribution by a laser diffraction particle size measuring method. In the measured particle size distribution, 90% cumulative weight particle size distribution diameter, D90, was 1.4 μm and the value of n in Rosin-Rammler equation obtained by using the measured value of this particle size distribution was 2.1.

A dye-sensitized solar cell was fabricated in the same manner as in Example 5 except that the above-mentioned titanium oxide was used in the metal oxide dispersion in place of titanium oxide P25 used in Example 1. The thickness of the photoactive electrode was 6 μm. This solar cell had a photovoltaic force of 4.1 mW/cm$^2$.

COMPARATIVE EXAMPLE 4

Into 50 g of an aqueous 0.1 N nitric acid solution, 10 g of tetraisopropoxytitanium was dripped with stirring. The resultant was kept at 80° C. for 12 hours and subsequently 30 g of water was added thereto. The mixture was treated at 200° C. for 12 hours (by using an autoclave) and concentrated so that the total amount became 15 g by using a rotary evaporator. It was confirmed that the titanium oxide fine particles thus generated had a BET specific surface area of 65 m$^2$/g. Furthermore, upon measurement of weight change of the titanium oxide using thermal analysis, a 10% weight loss was confirmed around 250° C. Then, 0.4 g of poly(N-vinylacetamide) (VIAC GE-191, manufactured by Showa Denko K. K.) was added to this solution and the mixture was stirred by supersonic wave to obtain a metal oxide dispersion. With this dispersion, a dye-sensitized solar cell was fabricated in the same manner as in Example 5. The thickness of the photoactive electrode was 5 μm. This solar cell had a photovoltaic force of 2.1 mW/cm$^2$.

COMPARISON BETWEEN EXAMPLES 5, 8 AND COMPARATIVE EXAMPLE 4

In the cell of Example 8 in which titanium oxide produced by a gas phase method was used exhibited increased photovoltaic force as compared with the cell of Example 5. In Comparative Example 4, the performance was decreased. This would be attributable to the state where isopropyl groups were adsorbed on the surface of titanium oxide, which prevented migration of electrons between the titanium oxide particles. As described above, use of titanium oxide produced by a gas phase method which has no organic substance adsorbed on the surface of titanium oxide improved the performance of the cell.

EXAMPLE 9

A dye-sensitized solar cell was fabricated in the same manner as in Example 5 except that in the metal oxide dispersion of Example 8, titanium oxide obtained by adding 10 mass% of titanium oxide having a specific surface area of 300 m$^2$/g (ST-01, manufactured by Ishihara Sangyo Kaisha, Ltd. (titanium oxide powder synthesized by a liquid phase method and dried) to the titanium oxide produced by a gas phase method was used. This solar cell had a photovoltaic force of 4.3 mW/cm$^2$.

In Example 9 in which the titanium oxide produced by a gas phase method and titanium oxide having a specific surface area corresponding to the range of from 100 to 500 m$^2$/g were used in combination, the performance was improved as compared with Example 8.

INDUSTRIAL APPLICABILITY

According to the present invention, those materials which cannot maintain their performance at heat treatment at high temperatures as performed in a conventional production process for dye-sensitized solar cells can be used in dye-sensitized solar cells, so that dye-sensitized solar cells which are light in weight, flexible, and inexpensive can be obtained.

The invention claimed is:

1. A method for producing a photoactive electrode for a dye-sensitized solar cell, comprising:
    coating a metal oxide dispersion comprising metal oxide fine particles, a binder and a solvent on a sheet-shaped electrode, and then evaporating the solvent to form a metal oxide film on the sheet-shaped electrode, and
    immersing the photoactive electrode comprising the sheet-shaped electrode having thereon a metal oxide film in a solution containing at least one of a halide, an alkoxide and a carboxide of a metal that constitutes the metal oxide film and then heat-treating the photoactive electrode at a temperature of from 80° C. to 200° C.

2. The method for producing a photoactive electrode for a dye-sensitized solar cell as claimed in claim 1, wherein the metal oxide dispersion is coated on the sheet-shaped electrode by using an atomizer.

3. A method for producing a photoactive electrode for a dye-sensitized solar cell, comprising heat-treating the photoactive electrode comprising a sheet-shaped electrode having thereon a metal oxide film as claimed in claim 1 at a temperature of from 100° C. to 200° C.

* * * * *